Patented Dec. 11, 1923.

1,477,135

UNITED STATES PATENT OFFICE.

HORACE W. LASH, OF SAN FRANCISCO, CALIFORNIA.

METAL BLOOM AND METHOD OF MAKING SAME.

No Drawing. Application filed February 8, 1919. Serial No. 275,871.

*To all whom it may concern:*

Be it known that I, HORACE W. LASH, a citizen of the United States, residing at San Francisco, in the county of San Francisco and State of California, have invented a certain new and useful Improvement in Metal Blooms and Methods of Making Same, of which the following is a full, clear, and exact description.

Large quantities of ferrous material such as cuttings, punchings, strips and other forms are available as scrap, resulting from manufacturing operations, and various ways have been found of utilizing and recovering this scrap material. The present invention proposes to use this scrap material and work it into such form and association with other materials that it may be utilized as a metal bloom suitable to be used as a charge for open hearth furnaces, the bloom forming in part or in whole the furnace charge, or for a similar purpose.

The invention contemplates the preparation of the bloom as a merchantable material in proper shape to be utilized as open hearth melting material.

Generally speaking, the invention may be said to comprise the elements and the combinations thereof set forth in the accompanying claims.

In proceeding I prepare an intimate mixture of iron oxide and coke or other suitable carbonaceous material in finely divided form, and I have found that a mixture in the proportion of 70 per cent iron oxide and 30 per cent coke is very effective for the purpose.

This mixture is placed and confined within a bundle of scrap ferrous material, which bundle is afterwards compressed, and the mixture of coke and iron ore are so placed in the bundle as to be approximately at the central portion thereof.

The scrap material forms approximately 40 per cent of the whole bundle, and the bundle with its contents will weigh between 200 and 300 pounds. I have found it advantageous to intimately mix with the iron oxide and carbonaceous material before placing the same in the bundle of scrap, a portion of finely divided cast iron, such as cast iron borings, turnings, small chips, or similar material. The cast iron contains metalloids which aid in the reduction of the iron oxide during the heating operation.

When the bundle has been formed as just described it is placed within a suitable heating furnace, and there subjected to a sufficient amount of heat to cause the metal of the bundle to become softened, and at the same time the iron oxide is more or less reduced by the carbon, which is mixed with it.

When the bundle of scrap ferrous material with its contained iron oxide and carbon is heated, it will be apparent that the carbon being within the bundle of scrap material is quite effectively protected against oxidizing action except that oxidizing action which occurs incident to the reduction of the iron ore. And further that the carbon is in a most advantageous position to combine with the scrap ferrous material so as to impart to the resultant metal the desired amount of contained carbon.

The bundle in its heated condition is removed from the furnace and while hot subjected to a forging operation, which effectually compacts and welds the material, thereby producing a metal bloom which is entirely merchantable as a melting stock.

The preparation of a metal bloom from scrap ferrous material in the manner indicated, is of particular importance to those localities in which cast iron is not produced, because of the lack of available supplies of coke within reasonable hauling distances.

But it will be obvious that even in these countries the amount of light scrap material produced is considerable, and the ability to utilize this scrap material for the purpose of making open hearth steel will at once appear to be of great advantage.

Having described my invention, I claim:—

1. A metal bloom comprising a partially fused and forged mass of scrap ferrous pieces and carbonaceous material.

2. A metal bloom comprising a partially fused and forged mass of scrap ferrous pieces and carbonaceous material which is enveloped by the mass.

3. A metal bloom comprising a partially fused and forged mass of scrap ferrous pieces and a mixture of carbonaceous material and iron oxide which is enveloped by the mass.

4. A metal bloom comprising a forged mass of scrap ferrous material, and a partially reduced mixture of iron oxide and carbonaceous material within the mass.

5. A metal bloom comprising a compressed mass of scrap ferrous material and a partially reduced mixture of iron oxide, finely divided carbonaceous material and finely divided cast iron within the mass.

6. The method of preparing a metal bloom which comprises preparing a bundle of scrap ferrous material containing within it carbonaceous material, heating the bundle until the metal softens, and then treating the bundle by a forging operation.

7. The method of preparing a metal bloom which consists in preparing a bundle of scrap ferrous material, placing a mixture of iron oxide and carbonaceous material within the bundle, heating the bundle until the metal is softened, and the iron oxide at least in part reduced, and then subjecting the bundle to a forging operation.

In testimony whereof, I hereunto affix my signature.

HORACE W. LASH.